United States Patent [19]

Palmer

[11] Patent Number: 4,470,016
[45] Date of Patent: Sep. 4, 1984

[54] PORTABLE PROBE CARRIER

[75] Inventor: Leslie W. Palmer, West Suffield, Conn.

[73] Assignee: United Technologies Corporation, Hartford, Conn.

[21] Appl. No.: 363,358

[22] Filed: Mar. 29, 1982

[51] Int. Cl.³ ............................ G01L 3/26; G01L 5/13
[52] U.S. Cl. .................................... 324/402; 324/378; 73/116
[58] Field of Search ............... 324/378, 402, 379, 384; 73/116, 117.3; D10/46, 75, 77, 78

[56] References Cited

U.S. PATENT DOCUMENTS

D. 267,553  1/1983  Bressler ............................ D10/75
4,399,407  8/1983  Kling ............................ 324/384 X

OTHER PUBLICATIONS

Hirsch: "Automatic Diagnosis of Engine Ailments", Electronics–May 2, 1966, pp. 70–74.

Primary Examiner—Stanley T. Krawczewicz
Assistant Examiner—Jose M. Solis
Attorney, Agent, or Firm—Dominic J. Chiantera

[57] ABSTRACT

A portable case structure functions as the depository, transporter and remote, work site satellite for a plurality of engine sensor probes which communicate with a parent test console through a common electrical umbilical connection.

5 Claims, 5 Drawing Figures

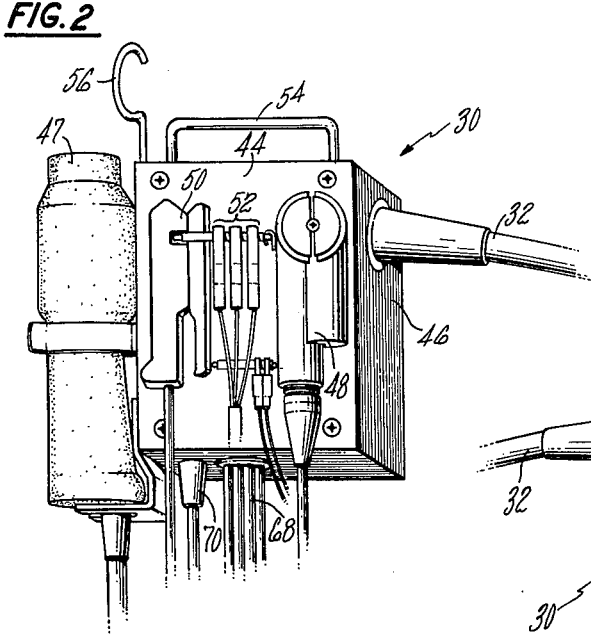
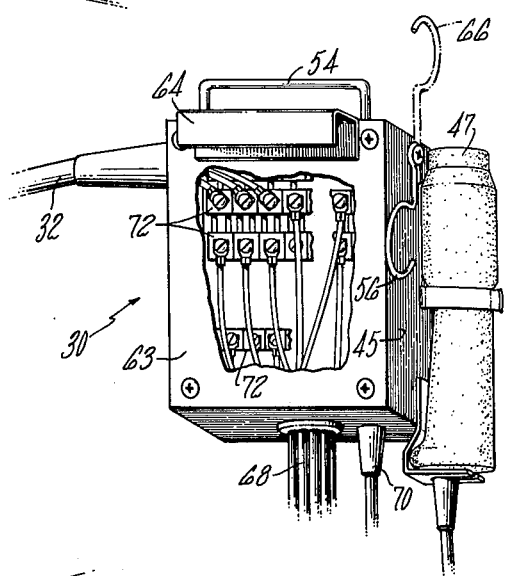
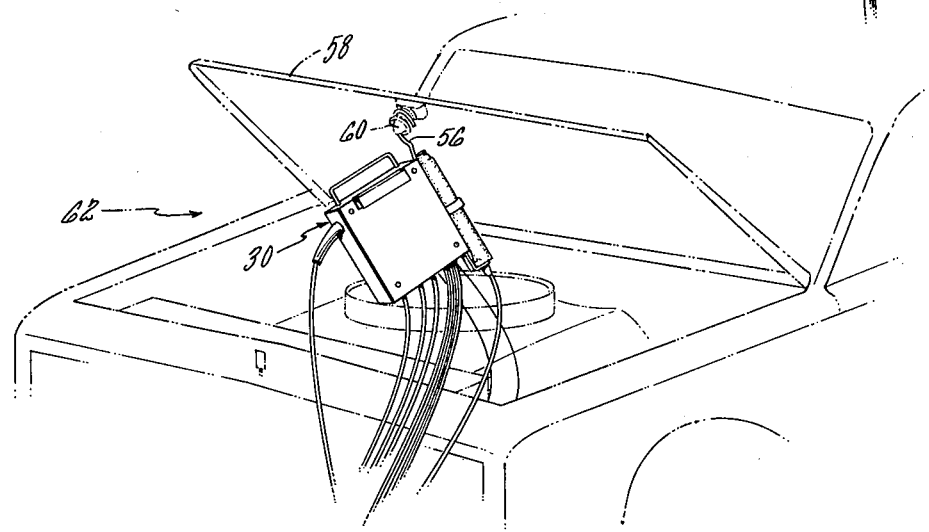

PORTABLE PROBE CARRIER

DESCRIPTION

1. Technical Field

This invention relates to portable test equipment, and more particularly to portable test equipment for testing internal combustion (IC) engines.

2. Background Art

As known, the servicing and repair of automotive internal combustion (IC) engines necessarily involves the testing of engine performance. These performance tests involve measurement of a number of different engine parameters, each requiring its own unique test sensors or probes, and each usually performed with the engine running. Since it is common for a single operator to perform a number of tests simultaneously, there is an obvious need for a high degree of care on the part of the operator for both his own safety as well as that of the equipment.

The rapid advances in microprocessor based test equipment coupled with the desire to improve the accuracy of diagnostic testing have further compounded the test operator's problems to the extent that each demands more information; a proliferation of tests, each devoted to some different aspect of performance which, in combination with other tests provide accurate pinpointing of a given fault.

At the same time the microprocessor based equipment has provided some degree of relief in that it allows for consolidation of test hardware, heretofore separate, into common console units. Instead of discrete pieces of equipment, e.g. dwell meter, manifold vacuum gage, tachometer, etc., each separately instrumented with the engine, these functions are now commonly housed and instrumented in one parent test console. This common console organization provides higher efficiency in terms of cost and operator productivity since time shared use of the microprocessor allows the single piece of equipment to perform a myriad of tests; a single piece of equipment with which the operator may become familiar and proficient. One disadvantage remains, however, e.g. the interface with the engine; each test requires its own sensor probe. Generally of different size and geometry thereby presenting practical storage problems and in some instances a safety hazard due to the proliferation of wiring between sensors and console. There still remains the possibility of entanglement of wires along the garage floor and the potential for dropping the sensor probes into the operating engine compartment while performing the tests.

DISCLOSURE OF INVENTION

The object of the present invention is to provide a streamlined engine sensor to test console interface.

According to the present invention, a multifunction test console for performing IC engine performance test measurements, each requiring the necessary antecedent sensed performance values from a dedicated one of a plurality of sensor probes, is characterized by a portable probe carrier comprising a separate, physically detachable storage and transport unit for carrying all of the console sensor probes, and connected to the console cabinet through a single electrical conduit umbilical which houses the electrical interconnection between the parent console and each of the individual sensor probes. In further accord with the present invention the probe carrier includes individual electrical connections to each sensor probe and has a designated mounting location for each probe on a mounting surface of the carrier case so as to provide easy storage and retrieval by the operator, whereby the portable probe carrier may be transported from the parent console and placed, within the reach of the umbilical conduit, in close proximity to the engine under test. In still further accord with the present invention, the portable probe carrier further includes mounting apparatus for releasably engaging the console cabinet or any number of different type or geometry mounting locations as may be found in an engine compartment. In still further accord with the present invention, the probe carrier may be mounted in releasably engaging fashion to a cantilevered boom fixture disposed on and rotatable about the console case to permit placement of the boom, with the probe carrier mounted thereto, above or adjacent to the work site.

The portable probe carrier of the present invention eliminates the practical difficulties associated with a multifunction test console unit; namely the potential for entanglement of the various sensor probe lines on the floor or within the engine compartment. As such, the potential for destroying or damaging the test equipment and causing injury to the operator are greatly reduced.

These and other objects, features and advantages of the present invention will become more apparent in light of the following detailed description of a best mode embodiment thereof, as illustrated in the accompanying Drawings.

BRIEF DESCRIPTION OF THE DRAWINGS

FIG. 2 is a perspective illustration of one view of the portable probe carrier of the present invention for use with the console of FIG. 1;

FIG. 3 is a perspective illustration of another view of the portable probe carrier of FIG. 2; and FIG. 4 is a perspective illustration demonstrating the mobility and applied use of the portable probe carrier of the present invention.

BEST MODE FOR CARRYING OUT THE INVENTION

Figure 1A:
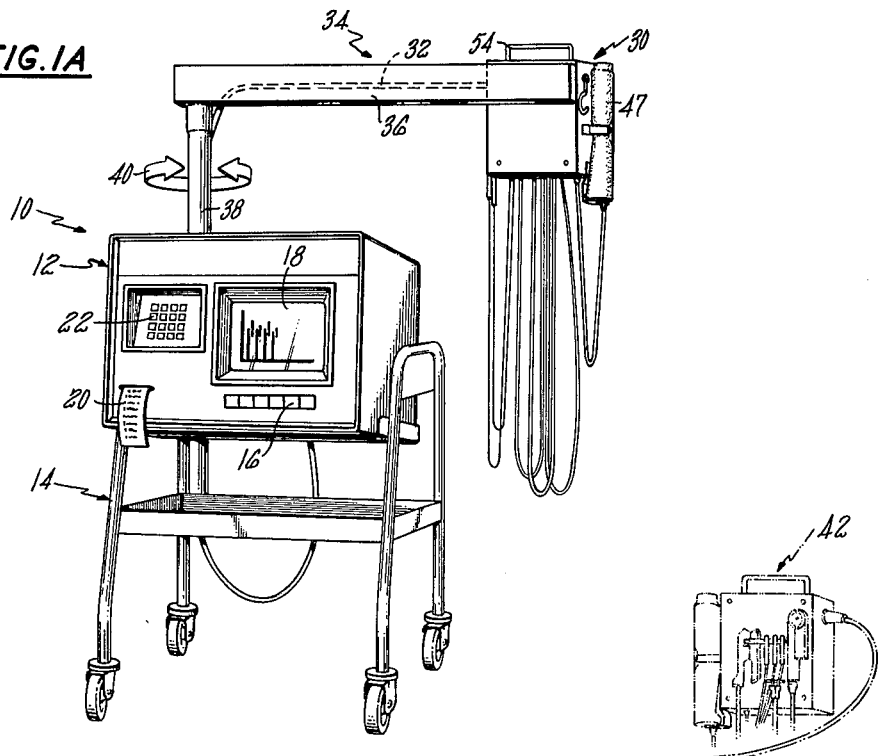
FIGS. 1A, 1B are perspective illustrations, front and back respectively, of a multifunction test console with which the present invention may be used.
Figure 1B:
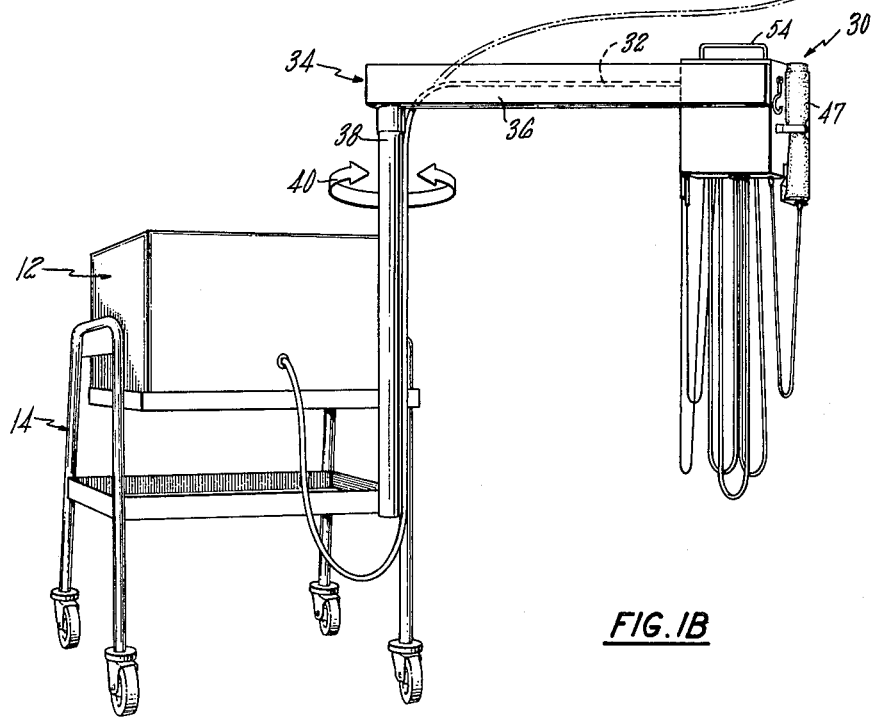

FIGS. 1A, 1B illustrate in perspective the front and rear views of a multifunction test console 10, such as the Autosense ® Computerized Engine Tester (CET) manufactured by Hamilton Test Systems ®. It is a microprocessor based test console capable of performing a plurality of engine diagnostic and performance test measurements. As many as ten distinctly different engine test functions, including: engine speed (tachometer), engine dwell, ignition secondary voltage, manifold vacuum, etc.

The test console includes the main cabinet 12 in a transportable cart mounting 14. Each test is activated through selection of one of a plurality of test function buttons 16 disposed on front face of the cabinet. A video display 18 is provided together with a hard copy printer 20 for data display and print out. A front face mounted keyboard 22 provides the man-machine interface which allows the operator to enter engine specification data or to query the microprocessor. It should be understood that the test console of FIGS. 1A, 1B is illustrative, and that the test console itself forms no part of the present invention.

While illustrative, the FIG. 1 CET demonstrates the basic characteristic of all multifunction test consoles, namely that each of the various tests performed require its own unique interface between the test equipment and the engine. The sensed signals differ as do the access requirements to obtain the signal input. As such, the sensor probes vary in both geometry and size, and each must be electrically connected to the common console. For the CET 10 this would require ten sets of sensor lines running between the engine compartment and the console, creating the likelihood of entanglement, or possibly dropping of the sensor probes or lines in the engine compartment.

In the present invention these dangers are minimized by use of a separate, detachable, portable probe carrier 30 connected to each sensor probe through individual sensor lines, and connected through a single electrical conduit umbilical 32 to the test console. The probe carrier is portable; it may be removed from the test console and transported about, to the extent of its umbilical conduit length. Alternatively it may remain with the console, mounted in a releasably engaging fashion to the console cabinet. To this extent the probe carrier may remain attached to the cabinet during use and/or storage. Alternatively again, the carrier may be releasably attached, or mounted on a swivel boom assembly 34 secured in turn to the console cabinet 12 and/or cart 14. The swivel boom includes an arm 36 mounted at one end in rotatable, interconnecting fashion to a pillar assembly 38; the pillar is mounted to the console (or cart) and the arm is rotatable through 360° in a plane perpendicular to the axis of the pillar (as shown by rotational arrowheads 40). The portable probe carrier is releasably secured at the distal end of the arm 36, i.e. the end opposite the pillar 38 and may be easily removed, as shown by the phantom illustration 42. Even while attached to the boom arm, as in FIG. 1B, the probe carrier may be positioned free of the cabinet, over the selected work site, by selective positioning of the boom.

Referring simultaneously to FIGS. 2, 3, in perspective illustrations of the probe carrier itself mounting surfaces 44, 45, 46 receive the various sensors which are shown mounted in storage locations on surfaces 44, 45. FIG. 2 illustrates a sampling of the various types of sensors used, including a timing light 47, a high voltage probe 48, timing light inductive pickup 50, battery connectors 52, and so on; each secured to a designated location on the surface 44, but arranged for easy retrieval by the operator. A handle 54 allows the probe carrier to be used as a hand held unit. In addition, as more clearly illustrated in FIG. 3, a retractable grappling hook 56 is provided. It permits releasable mounting of the carrier to any convenient location within, or adjacent to, the actual work site, e.g. the hood 58 or hood latch 60 of the automobile 62 shown in phantom in FIG. 4.

FIG. 3, which is partially cutaway, illustrates in perspective the opposite side surface of the probe carrier, e.g. the back side 63 which includes flange mount 64. The flange mount is used principally to mount the probe carrier to the boom arm. It may, however, be used as an auxiliary mount, or if considered expedient as or an alternative to the hook 56 for temporarily attaching the sensor box to a selected mounting structure or projection. In FIG. 3 the grappling hook 56 is shown retracted, as it appears withdrawn behind the timing light 46. The phantom illustration 66 again shows it completely extended as in FIG. 2.

The cutaway segment illustrates a portion of the probe carrier interior. The probe carrier in its function as a portable depository for the sensor probes must provide the electrical connection interface between the electrical umbilical 32 and the various probe lines 68, 70. In FIG. 3 this is partially illustrated with the use of a plurality of interior mounted terminal strips 72, however, any suitable interconnecting schemes as may be known to those skilled in the art, may be used.

Although the invention has been shown and described with respect to a best mode embodiment thereof, it should be understood by those skilled in the art that the foregoing and various other changes, omissions and additions in the form and detail thereof may be made therein without departing from the spirit and scope of this invention.

I claim:

1. Apparatus for electrically connecting the signal lines from one or more engine sensor probes, each selectable for use by an operator for sensing the value of a probe related parameter in an internal combustion (IC) engine, to a multifunction test console responsive at corresponding parameter inputs to the selected probe sensed signal values for providing therefrom a measurement of engine performance quality, comprising:

electrical conduit means for enclosing a plurality of electrical connection lines, one associated with each sensor signal line, each connected at one end to a parameter input of the test console;

interconnect means, responsive to the sensor probe signal lines and to said connection lines, for interconnecting the sensed value lines signals from each probe signal line to its associated connection line; and a portable case structure, susceptible to hand transport by an operator and having a housing for enclosing said interconnect means, said housing having one or more apertures along the outer surface thereof for providing electrical communication between said interconnect means, said connection lines, and the probe signal lines, said housing outer surface further including sensor probe mounting means for securing in storage thereon, in a releasably engaging manner, any and all of the sensor probes, whereby said case structure and sensor probes may be removed from the test console and hand transported to a remote work site at a distance limited only by said electrical conduit means.

2. The apparatus of claim 1, wherein said case structure further includes housing mounting means for mounting said case structure in demountable fashion to said test console.

3. The apparatus of claim 1, wherein said case structure further includes universal attaching means disposed on said housing for permitting releasable attachment of said case structure to an operator selected attaching member at the work site.

4. The apparatus of claim 3 wherein said universal attaching means is a retractable grappling hook.

5. The apparatus of claim 1, wherein said case structure housing further includes a handle to facilitate operator transport of said case structure and sensor probes secured thereto.

* * * * *